Feb. 28, 1961    J. S. McCLELLAND, JR    2,973,294
FAN-SHAPED HONEYCOMB AND METHOD OF MAKING SAME
Filed Sept. 9, 1957    2 Sheets-Sheet 1

INVENTOR.
Joseph S. McClelland, Jr.
BY
Townsend and Townsend
Attorneys

Feb. 28, 1961 J. S. McCLELLAND, JR 2,973,294
FAN-SHAPED HONEYCOMB AND METHOD OF MAKING SAME
Filed Sept. 9, 1957 2 Sheets-Sheet 2
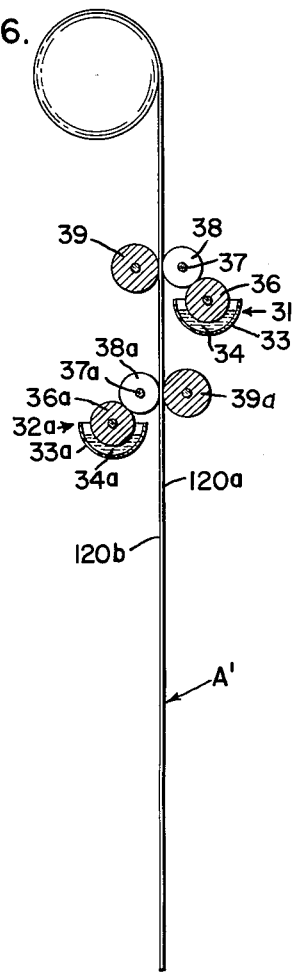
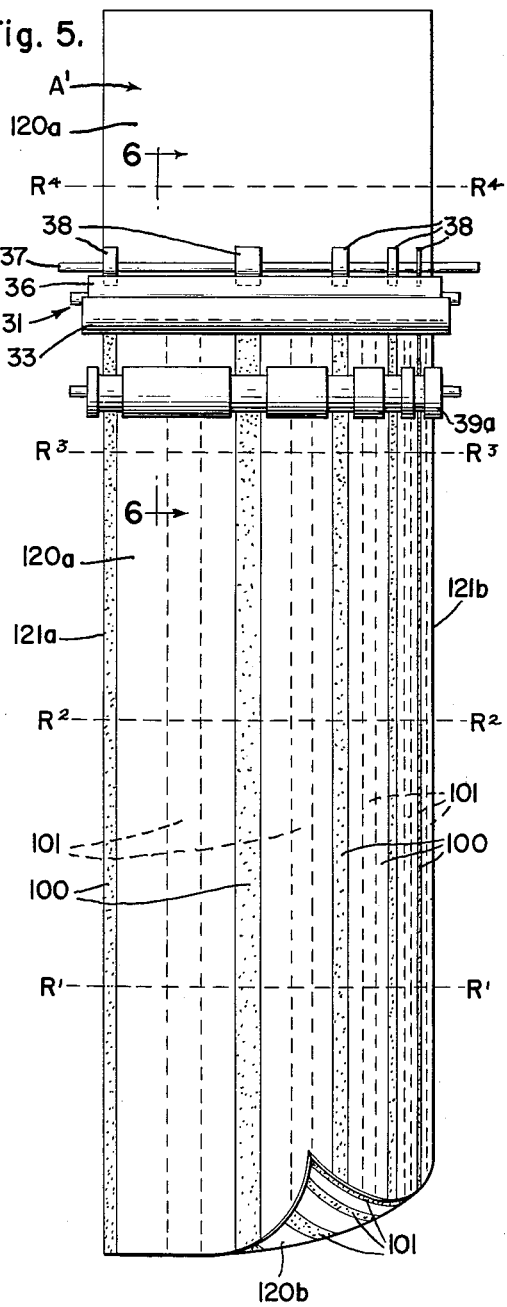
INVENTOR.
Joseph S. McClelland, Jr.
BY
Townsend and Townsend
attorneys

United States Patent Office 2,973,294
Patented Feb. 28, 1961

2,973,294

FAN-SHAPED HONEYCOMB AND METHOD OF MAKING SAME

Joseph S. McClelland, Jr., Hayward, Calif., assignor to Hexcel Products Inc., Berkeley, Calif., a corporation of California Filed Sept. 9, 1957, Ser. No. 682,770

2 Claims. (Cl. 154—45.9)

This invention relates to the art of honeycomb manufacture.

More particularly the invention relates to improved method of manufacturing honeycomb which can be expanded into a curvatured body about a radius of curvature coplanar with the webs or ribbons defining the honeycomb structure. Stated otherwise, the invention relates to a honeycomb product which in expanded condition defines a fan-shaped pattern and in which the inner or base portions of the fan-shaped structure are defined by approximately hexagonal cell openings of substantially smaller size or pitch than the hexagonal openings defining the outer extremities or regions of the said fan-shaped structure.

In the manufacture of certain types of honeycomb structures, such as certain types of honeycomb core sandwich structures for aircraft and other uses, it may be desirable to provide generally pie-shaped or fan-shaped segments of honeycomb which, for example, can be pieced and fitted together to define a larger composite honeycomb body of arcuate configuration. Generally speaking in applications where such pie-shaped or fan-shaped honeycomb segments are used it is desirable to make the honeycomb with a higher density at the base or inner part of the fan-shaped segment, than at the outer extremities thereof. Furthermore, and as a general statement, in any honeycomb sandwich structure it is desirable from the standpoint of obtaining an optimum strength/weight ratio, to form or expand all of the honeycomb cells to as fully open and near-perfect hexagonal configuration as possible. In this regard, it is possible to expand conventional honeycomb of uniform cell size in a fan-shaped pattern, but when this is done the cells adjacent the base or inner regions of the fan-shaped piece will be greatly under-expanded in comparison to the cells defining the outer extremities of the piece.

The principal object of the present invention is to provide a honeycomb section which is expandable into an open, approximately hexagonal-shaped cell configuration, and in which the relatively smaller cell openings defining the base or inner regions of the fan-shaped section progressively increase in size toward the outer regions or extremities of the section. As will more fully hereinafter appear, a product embodying the present invention fulfills the two requisites of providing a honeycomb section in which all of the cells are expanded to nominal or fully-opened cell size, and in which the cellular material increases in density from the outer regions towards the base regions of the fan-shaped piece.

A further object and feature of the invention is that a product made in accordance with the invention may be manufactured relatively economically and according to any one of several types of basic honeycomb manufacturing processes well known and understood in the art.

Other numerous objects and advantages of the present invention will become apparent upon reading the following specification and referring to the accompanying drawings in which similar characters of reference represent corresponding parts of each of the several views.

Fig. 5 is a substantially schematic view in plan showing how adhesive lines may be applied to a continuous web of material which may subsequently be cut into sections of equal dimension and stacked into a section of honeycomb in accordance with the invention.

Fig. 6 is a sectional view taken substantially on line 6—6 of Fig. 5.

Figure 1:
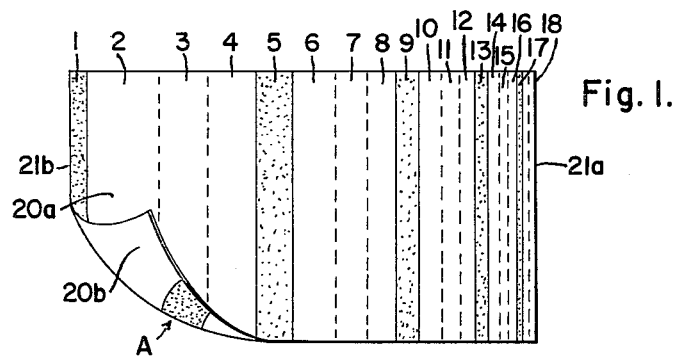
Fig. 1 is a plan view of a section of web material to which has been applied adhesive lines in a novel pattern according to the present invention.

Referring now more particularly to the drawings, the reference character A designates identical sections of web or sheet material such as metal foil, paper, resin-impregnated glass or textile fabric, or the like, from which the honeycomb material is to be made. Each of the sections A may be considered as having an obverse side 20a and a reverse side 20b, and each section is rectangular in plan. For purposes of convenient reference the parallel opposite side margins of the web are designated at 21a and 21b respectively.

As indicated in detail in Fig. 1 there is applied to the obverse side 20a of the section A a plurality of spaced parallel adhesive lines designated by the reference numerals 1, 5, 9, 13 and 17, respectively. The lines extend in a direction parallel to opposite side margins 21a and 21b of the web. As indicated in the drawings the spacing or distance between adjacent adhesive lines increases the further away they are from side margin 21a and the closer they are to opposite side margin 21b. Thus, for example, the spacing between adjacent adhesive lines 13—17 located closest to side margin 21a is roughly one-fourth of the spacing or distance between adjacent lines 1—5 located nearest margin 21b.

Applied to the opposite or reverse side 20b of the web section A are a plurality of parallel spaced adhesive lines designated by the reference characters 3, 7, 11, 15 and 18 respectively. These latter adhesive lines extend in a direction parallel to opposite side margins 21a and 21b, but are disposed in staggered relation to the adhesive lines applied to the obverse side 20a of the web section as previously hereinabove described.

Figure 2:
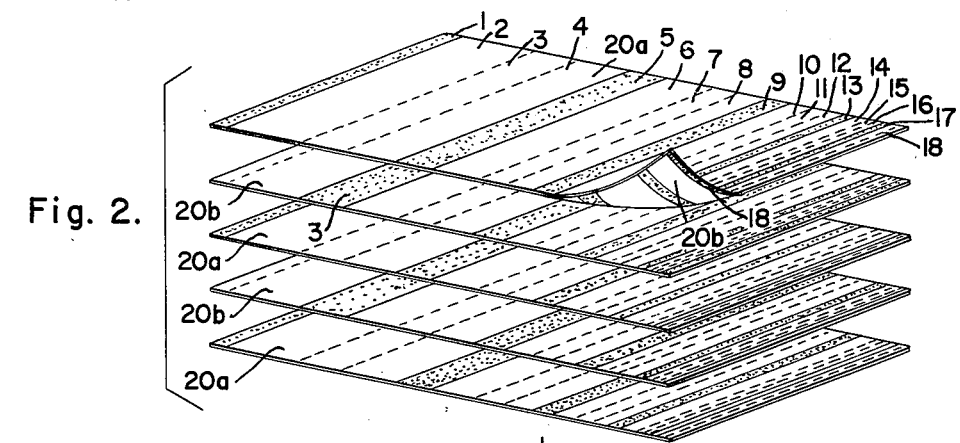
Fig. 2 is a perspective view of a stack of superposed sections as shown in Fig. 1 and with the sections in the stack shown in exploded relationship.
Figure 3:
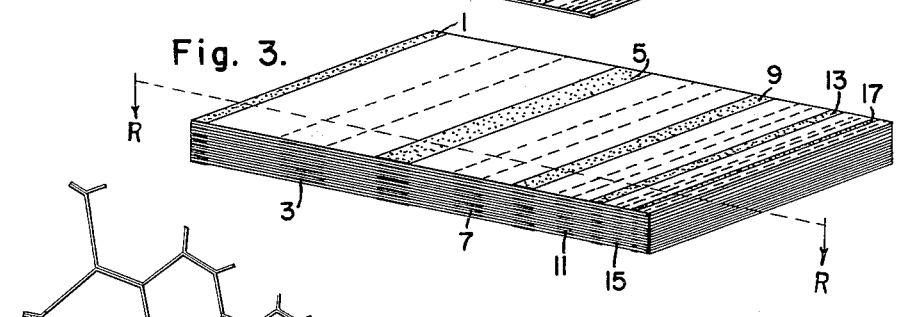
Fig. 3 is the same as Fig. 2, but showing the stack in compressed or compacted relationship.

Figs. 2 and 3 illustrate how the identically formed web sections A with adhesive lines applied to both obverse and reverse sides, as above explained, may be superposed one to the other into a stack. The sections in the stack are oriented in such manner that the obverse side 20a of each section is in contacting juxtaposed position relative to the reverse side or surface of an adjacent section. Consequently, when the sections are compressed and adhered together along the aforementioned adhesive lines it will be observed that the adhesive lines adhering each pair of juxtaposed obverse and reverse surfaces will be disposed in staggered parallel relation to the adhesive lines adhering each adjacent pair of juxtaposed surfaces in said stack.

Figure 4:
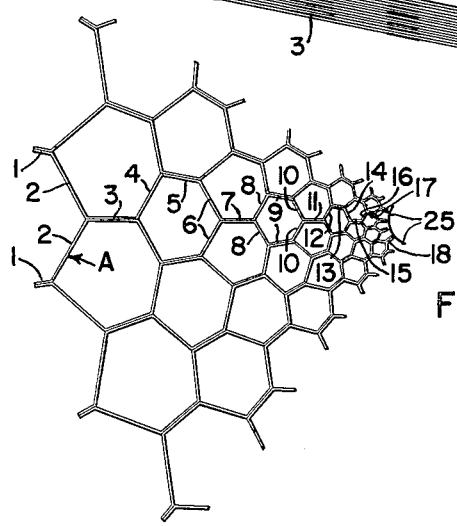
Fig. 4 is a plan view of a section of honeycomb expanded from the stacks of Figs. 2 and 3 and embodying the invention.

Fig. 4 illustrates how the stack of material indicated in Figs. 2 and 3 or a section or slice cut therefrom along a transverse cut line R—R can be expanded in a fan-shaped or pie-shaped pattern body as viewed in plan and into an open, approximately hexagonal-shaped, cell configuration. In this form the web material defines substantially corrugated ribbons, joined together node to node and extending divergently and substantially radially outwardly from a common base point or apex 25 of the fan-shaped body. It will be observed that the cell openings which are relatively closer to the base or inner end 25 of the fan-shaped piece are considerably smaller in size or cell pitch than the cell openings defining the outer regions or extremities of the structure. More specifically, the cell openings that are defined by node bonds of the relatively closer spaced adhesive lines will necessarily be of smaller size than the cell openings defined by node bonds of the further-apart spaced adhesive lines. For purposes of convenient reference and comparison between the components of Fig. 1 and Fig. 4, respectively, all of the adhesive and non-adhesive surfaces of the web section shown in Fig. 1 are consecutively numbered 1–18 inclusive, and these same reference characters will be observed to appear in the expanded honeycomb structure shown in Fig. 4.

The scope of the present invention is not considered to be limited by the type of web material chosen to make the honeycomb, the type or kind of adhesive employed, or the method or techniques employed to apply the adhesive lines to a web. The choice of these factors is considered a matter well within the skill of the art and is dependent upon the dictates and requirements of particular job specifications. It is further considered within the scope of the present invention that the adhesive lines may be applied to the web material by roller applicating, stencil, brush, gravure, or by other known adhesive applicating techniques. The lines may be applied either to individual sections after the sections have been cut from a continuous web, or alternatively the adhesive lines may be applied to a continuously-moving web of material and thereafter a stack of the web material may be formed as by cutting the web into sections superposed to one another as indicated in U.S. Patent No. 2,734,843, or by lapping the web material back and forth over itself into a stack of the honeycomb material, as indicated in U.S. Patent No. 2,610,934.

By way of example, Figs. 5 and 6 illustrate how a continuous web A may be passed between suitable adhesive applicating assemblies indicated generally at 31 and 32a which function to apply spaced longitudinally extending parallel lines of adhesive to opposite sides of the web, and with the spacing between the lines progressively increasing from adjacent margin 121a toward margin 121b.

The adhesive applicating assembly 31 which is adapted to the adhesive lines indicated generally at 100 to the obverse side 120a of the web is schematically indicated as including an adhesive tank 33 containing adhesive 34, a pickup roller 36 partly immersed in the adhesive 34, and an applicating roller 37 having printing heads 38 adapted to pick up adhesive from roller 36 and transfer adhesive in the form of continuous lines 100 to the obverse side 120a. A back-up roller 39 is provided opposite roller 37 between which two latter elements the web A' is adapted to travel.

The adhesive applicating assembly 32a which is operable to apply adhesive lines 101 to the reverse side 120b of the web may be considered as comprising substantially identical components to those previously designated with reference to assembly 31. Accordingly, components of assembly 32a are numbered similarly to corresponding components of assembly 31 but are suffixed by the letter "a" to distinguish the parts in the drawings.

The continuous web A' with adhesive lines applied in the above manner may be cut into sections of equal dimensions such as along cut lines designated at R1, R2, R3, R4. The cut lines may be made by a rotary cutter or by any other suitable cutting mechanism, whereafter the cut sections may be stacked and superposed relative to one another in the manner described to form a pack of expandable honeycomb material.

Although the present invention has been described in some detail by way of illustration and example for purposes of illustration and understanding, it is appreciated that numerous changes and modifications may be practiced within the spirit of the invention as limited only by the scope of the claims appended hereto.

I claim:

1. A honeycomb structure comprising a plurality of rectangular sheets of web material of equal dimensions superposed one to the other in a stack; spaced parallel adhesive lines adhering each pair of adjacent juxtaposed surfaces of said sheets together; all of said adhesive lines extending between and parallel to two opposite side margins of said stack; the spacing between all said adhesive lines progressively increasing from adjacent one side margin toward the opposite side margin of the stack; the adhesive lines joining each pair of juxtaposed surfaces in said stack disposed in staggered relation to the adhesive lines adhering each adjacent pair of juxtaposed surfaces in said stack; said stack expandable into open approximately hexagonal shaped cell configuration and in a fan-shaped pattern with the relatively closer spaced adhesive lines located adjacent the base of the fan defining progressively smaller cell openings than the cell openings located at the outer extremities of the fan defined by the progressively farther apart spaced adhesive lines adhering said sheets together.

2. An open cell honeycomb product comprising a plurality of corrugated ribbons joined together node to node and defining a substantially fan-shaped body in plan with said ribbons extending divergently and substantially radially outwardly from a base point; said node-joined corrugated ribbons defining substantially hexagonal cell openings; the spacing between adjacent nodes progressively increasing in distance as the distance between said nodes and said base point increases; the cell openings defined by the relatively closer spaced nodes located toward the base point extremities of said fan-shaped body being progressively smaller in size than the cell openings defined by the wider apart spaced nodes located toward the outer extremities of said fan-shaped body.

References Cited in the file of this patent

UNITED STATES PATENTS

| | | |
|---|---|---|
| 2,098,193 | Munters | Nov. 2, 1937 |
| 2,212,481 | Sendzimir | Aug. 20, 1940 |
| 2,277,791 | Small | Mar. 31, 1942 |
| 2,288,170 | Moeller | June 30, 1942 |
| 2,333,343 | Sendzimir | Nov. 2, 1943 |
| 2,608,502 | Merriman | Aug. 26, 1952 |
| 2,734,843 | Steele | Feb. 14, 1956 |
| 2,840,811 | McMillan | June 24, 1958 |
| 2,848,132 | Davous | Aug. 19, 1958 |